United States Patent [19]

Rogers

[11] Patent Number: 4,676,523
[45] Date of Patent: Jun. 30, 1987

[54] SUSPENSION SYSTEM FOR A TRAILER OR THE LIKE

[76] Inventor: Ralph R. Rogers, 733 W. 21st, So. Sioux City, Nebr. 68776

[21] Appl. No.: 780,617

[22] Filed: Sep. 26, 1985

[51] Int. Cl.⁴ ............................................. B60G 5/00
[52] U.S. Cl. ................................... 280/682; 280/712
[58] Field of Search ........................ 280/682, 712, 686

[56] References Cited

U.S. PATENT DOCUMENTS

| | | | |
|---|---|---|---|
| 2,317,057 | 4/1943 | Higby | 267/64.27 |
| 2,752,164 | 6/1956 | Bower | 280/682 |
| 2,771,303 | 11/1956 | Frazier | 280/712 |
| 3,031,179 | 4/1962 | Peirce | 267/64.27 |
| 3,309,107 | 3/1967 | Chieger | 280/712 |
| 4,033,606 | 7/1977 | Ward | 280/682 |
| 4,033,608 | 7/1977 | Sweet | 280/711 |
| 4,371,189 | 2/1983 | Raidel | 280/682 |
| 4,397,478 | 8/1983 | Jensen | 280/711 |
| 4,420,171 | 12/1983 | Raidel | 280/682 |
| 4,502,707 | 3/1985 | Jable | 280/682 |
| 4,504,079 | 3/1985 | Strong | 280/683 |

FOREIGN PATENT DOCUMENTS 112308   9/1981   Japan ..................................... 280/686

Primary Examiner—John J. Love
Assistant Examiner—Ross Weaver
Attorney, Agent, or Firm—Zarley, McKee, Thomte, Voorhees & Sease

[57] ABSTRACT

A suspension system for a trailer or the like wherein the trailer comprises a pair of longitudinally extending frame members having a body mounted thereon. Spaced-apart front and rear axles are disposed beneath the frame members in a transverse relationship thereto and have ground engaging wheels on the ends thereof. The suspension system operatively secures each of the frame members to the axle. Each of the suspension systems comprises front and rear leaf springs mounted in a tandem relationship one behind the other with the forward end of the front leaf spring being secured to one frame member and the rearward end of the rear leaf spring being secured to the same frame member. The yoke interconnects the adjacent ends of the leaf springs and has an air suspension system secured thereto. The air suspension system is operatively connected to the body of the trailer.

2 Claims, 6 Drawing Figures

SUSPENSION SYSTEM FOR A TRAILER OR THE LIKE

BACKGROUND OF THE INVENTION

This invention relates to a suspension system and more particularly to an air suspension system for a tandem trailer or the like.

Conventional trailers of the tandem type normally have a pair of transversely extending axles which are positioned beneath longitudinal frame members. Ordinarily, a pair of leaf springs arranged in tandem fashion one behind the other connect each of the frame members to the axles. The conventional suspension just described results in a less than smooth ride which can be harmful when the trailer is being used to transport valuable horses or the like. The conventional suspension systems are unable to compensate for extreme load conditions which is highly undesirable.

Therefore, it is a principal object of the invention to provide an improved suspension system for a trailer or the like.

A further object of the invention is to provide a suspension system for a trailer or the like which combines an air bag and a pair of leaf springs arranged in a tandem fashion one behind the other beneath each of the frame members of the trailer.

A further object of the invention is to provide a suspension system which greatly improves the riding characteristics of the trailer or the like.

Yet another object of the invention is to provide a suspension system for a trailer or the like having the ability to compensate for large loads.

Still another object of the invention is to provide an improved suspension system for a trailer or the like which is durable and safe.

These and other objects will be apparent to those skilled in the art.

SUMMARY OF THE INVENTION

A suspension system interconnects each of the frame members of a trailer or the like with a pair of transversely extending axles positioned therebelow. A pair of leaf springs arranged in a tandem fashion one behind the other connect each of the frame members to the pair of axles. An elongated yoke interconnects the pair of springs and a post secured thereto which extends upwardly therefrom. A support is secured to the body of the trailer and an air bag is positioned between the support and the upper end of the upstanding post which is vertically movable with respect to the support means. As the wheels on the axles encounter road bumps, the air bag and the leaf springs tend to absorb the same.

DESCRIPTION OF THE PREFERRED EMBODIMENT

Figure 1:
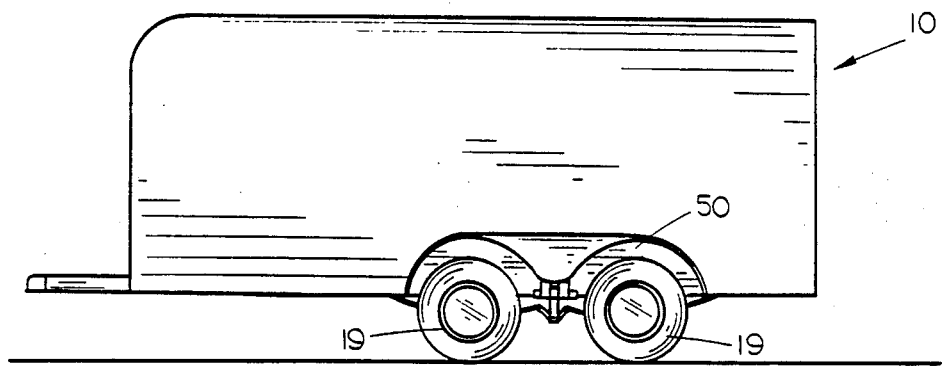
FIG. 1 is a side view of the trailer having the suspension system of this invention onto thereon.
Figure 2:
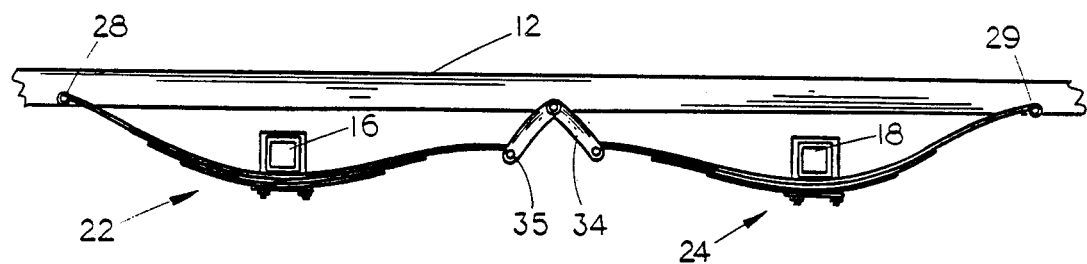
FIG. 2 is a side view of a conventional suspension system.
Figure 3:
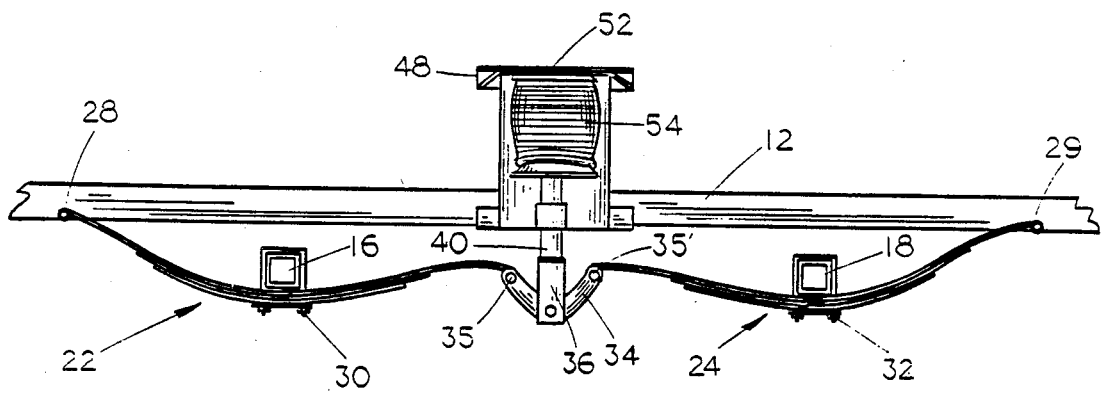
FIG. 3 is a view similar to FIG. 2 illustrating the suspension system of this invention.
Figure 4:
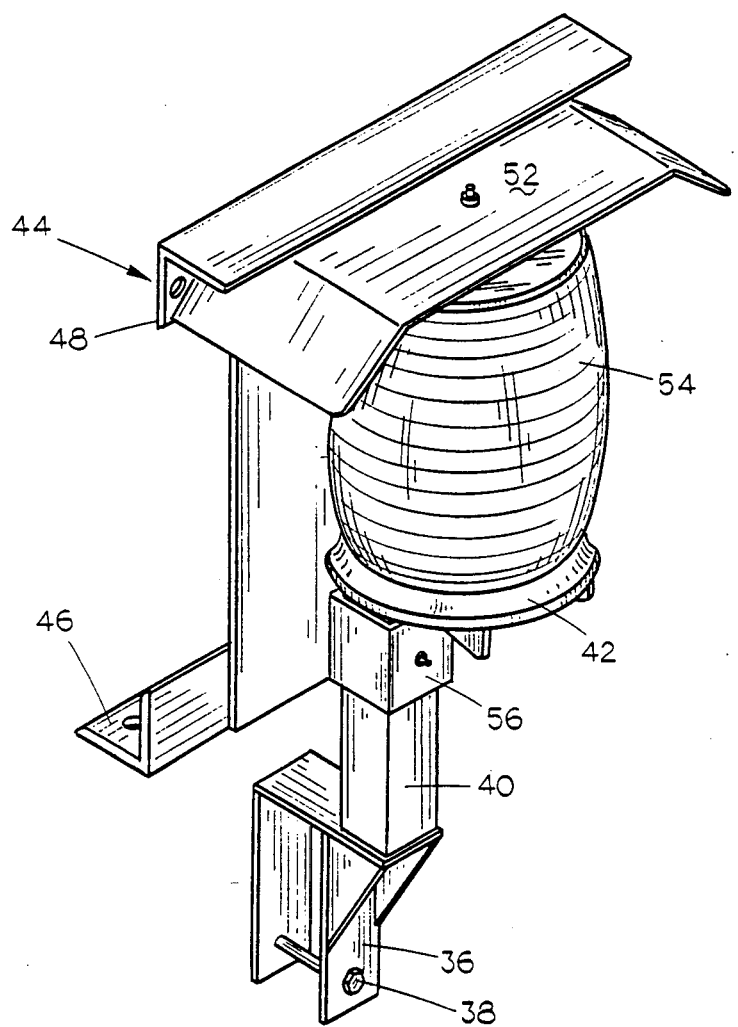
FIG. 4 is a partial perspective view of a portion of the suspension system.
Figure 6:
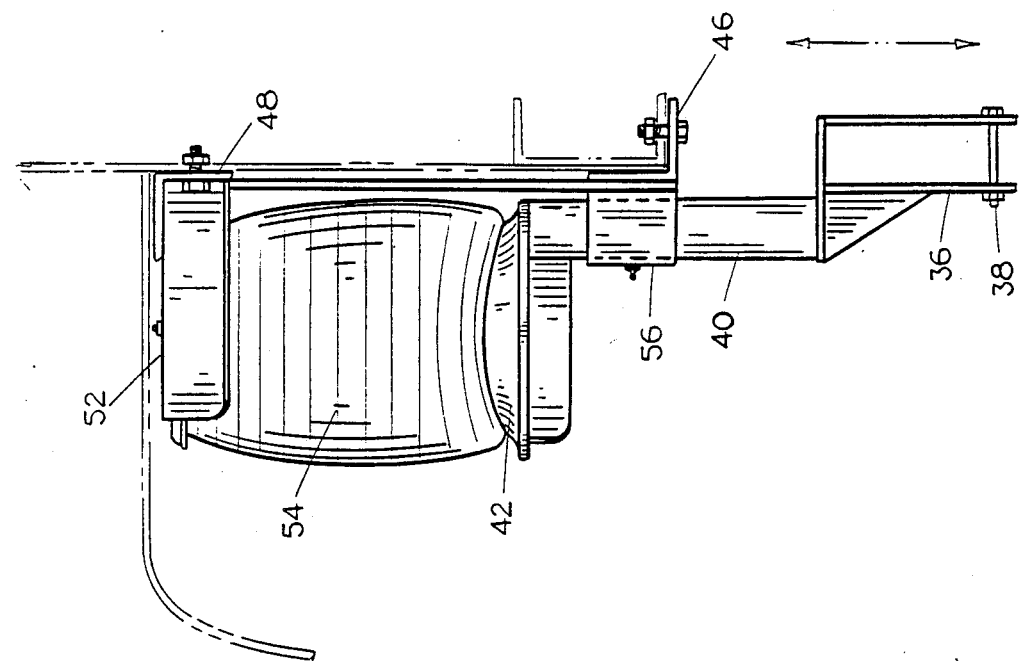
FIG. 6 is a front view of a portion of the suspension system.
Figure 5:
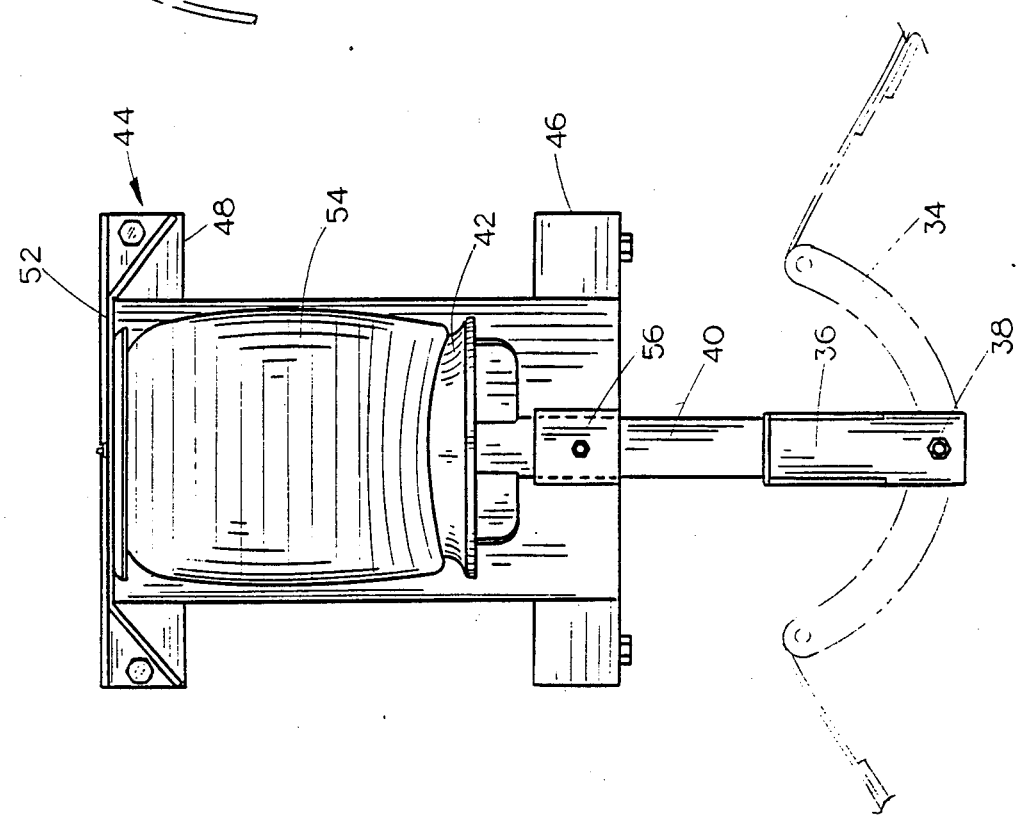
FIG. 5 is a side view of a portion of the suspension system.

In the drawings, the numeral 10 refers to a conventional trailer including a pair of longitudinally extending frame members 12 having a pair of transversely extending axles 16 and 18 positioned therebelow. Ground engaging wheels 19 are secured to the ends of the axles in conventional fashion. FIG. 2 illustrates the type of suspension system normally found on the trailers or the like. FIGS. 1 and 3–6 illustrate the suspension system 20 of the invention. Positioned at each side of the trailer 10 is the suspension system 20 which mounts the axles 16 and 18 to the trailer 10. Inasmuch as the suspension systems at each side of the trailer are identical, only a single suspension system will be described.

Suspension system 20 includes front and rear leaf springs 22 and 24 respectively. As seen in the drawings, the leaf springs 22 and 24 are arranged in a tandem fashion one behind the other. The forward end of front leaf spring 22 is connected to frame member 12 by a suitable and conventional shackle 28. Similarly, the rearward end of rear leaf spring 24 is connected to frame member 12 by a conventional shackle 29. Front axle 16 is connected to front leaf spring 22 by means of a U-bolt assembly 30. Similarly, rear leaf spring 24 is connected to rear axle 18 by U-bolt assembly 32 and to frame member 12 by shackle 29. A substantially U-shaped yoke 34 is pivotally connected and extends between the rearward end of front leaf spring 22 and the forward end of rear leaf spring 24. For purposes of description, the pivotal connections just described will be referred to with the reference numerals 35 and 35', respectively.

Bracket 36 is secured to yoke 34 by bolt 38 and has a post 40 secured thereto which extends upwardly therefrom. Support plate 42 is secured to the upper end of post 40 and extends laterally therefrom as seen in the drawings.

The numeral 44 refers to a support which includes a pair of angle members 46 and 48 which are secured to the body 50 of the trailer 10. Support 44 includes a support plate 52 which extends outwardly from angle member 48 as also seen in the drawings. The numeral 54 refers to a conventional air bag of the selectively inflatable type which is positioned between the support plate 52 and the support plate 42. As seen in the drawings, post 40 slidably extends upwardly through a sleeve 56 which is operatively secured to support 44.

In operation, the airbags 54 on the suspension system are inflated to the desired amount. Ordinarily, the pressure within the airbags would be increased when heavy loads are being hauled by the trailer. In use, bumps or the like on the road surface which are transmitted to the wheels 19 cause the axles 16 and 18 to be successively moved upwardly towards the frame of the trailer. The ends of the springs 22 and 24 pivot relative to the yoke 34 which pivots relative to the bracket 36. The upward movement of the axle 16 and 18 tend to move the bracket 36 upwardly which causes the post 40 to move upwardly through the sleeve 56 to compress the airbag 54.

The cooperation between the springs, yoke 34, bracket 36, post 40 and the airbag 54 tends to "smooth out" the ride of the trailer. It can therefore be seen that the invention accomplishes at least all of its stated objectives.

I claim:

1. In combination,
   a wheeled vehicle including a pair of longitudinal frame members,
   a body mounted on said frame members,
   spaced-apart front and rear axles disposed beneath said frame members in a transverse relationship thereto,
   ground-engaging wheels on the ends of said axles,
   a suspension system operatively securing each of said frame members to said axles,
   each of said suspension systems comprising front and rear leaf springs mounted in tandem relationship one behind the other, each of said leaf springs having rearward and forward ends, means securing each of said front and rear leaf springs, intermediate the lengths thereof, to said front and rear axles respectively, the forward end of said front leaf spring and the rearward end of said rear leaf spring being pivotally secured to the associated frame member, an elongated yoke means connecting the rearward end of said front leaf spring and the forward end of said rear leaf spring, and an air suspension system pivotally secured at one end to said yoke means and secured at the other end to the body of said vehicle,
   said air suspension system comprising a first bracket means pivotally secured to said yoke means, an upstanding post means secured to said first bracket means and extending upwardly therefrom, a support means secured to said body and having a support portion, a support member secured to the upper end of said post means positioned below said support portion, an inflated air bag positioned between said support portion and said support member, said post means and said support member being vertically movable with respect to said support means.

2. The combination of claim 1 wherein said support means has a sleeve means mounted thereon, said post means slidably extending upwardly through said sleeve means.

* * * * *